United States Patent
Zomerdijk et al.

(10) Patent No.: US 10,258,053 B2
(45) Date of Patent: Apr. 16, 2019

(54) EVISCERATION APPARATUS AND A METHOD FOR EVISCERATING SUSPENDED POULTRY

(71) Applicant: Meyn Food Processing Technology B.V.

(72) Inventors: Hermanus Laurentius Zomerdijk, Oostzaan (NL); Evert Kikstra, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 15/854,888

(22) Filed: Dec. 27, 2017

(65) Prior Publication Data
US 2018/0199581 A1 Jul. 19, 2018

(30) Foreign Application Priority Data
Jan. 16, 2017 (NL) .................................. 2018174

(51) Int. Cl.
*A22C 21/00* (2006.01)
*A22C 21/06* (2006.01)

(52) U.S. Cl.
CPC .................... *A22C 21/06* (2013.01)

(58) Field of Classification Search
CPC ..... A22C 21/00; A22C 21/06; A22C 21/0007; A22C 21/0069; A22C 21/0092
USPC .......................................... 452/106, 107, 117
See application file for complete search history.

(56) References Cited

U.S. PATENT DOCUMENTS

| 5,569,072 | A | * | 10/1996 | Tieleman | A22C 21/06 452/117 |
| 5,707,280 | A | * | 1/1998 | Tieleman | A22C 21/06 452/117 |
| 6,811,478 | B2 | * | 11/2004 | van den Nieuwelaar | A22C 21/06 452/117 |
| 7,500,910 | B2 | * | 3/2009 | Sorensen | A22C 21/0053 452/117 |
| 7,976,376 | B2 | * | 7/2011 | Kroeckel | G07F 17/3248 463/20 |

FOREIGN PATENT DOCUMENTS

| EP | 0497014 A1 | 8/1992 |
| EP | 0587253 A2 | 3/1994 |
| EP | 0839455 A1 | 5/1998 |
| WO | WO 01/52658 A1 | 7/2001 |
| WO | WO 2016/013931 A | 1/2016 |

OTHER PUBLICATIONS

PCT Search Report for application NL 2018174 dated Mar. 11, 2017.

* cited by examiner

*Primary Examiner* — Richard T Price, Jr.
(74) *Attorney, Agent, or Firm* — Dority & Manning, P.A.

(57) ABSTRACT

Evisceration apparatus for eviscerating a poultry carcass suspended by the legs. The apparatus may include an evisceration tool that is movable up and down and into and out of a body cavity of the poultry. The evisceration tool can include two bracket halves that connect to each other with a hinge at a lower extremity of the tool, wherein the two bracket halves may be embodied with cooperating clamping faces adjacent to said hinge for clamping a part of the viscera of the poultry when the two bracket halves are moved towards each other from an open position into a closed position.

13 Claims, 18 Drawing Sheets

EVISCERATION APPARATUS AND A METHOD FOR EVISCERATING SUSPENDED POULTRY

PRIORITY STATEMENT

The present application claims priority under 35 U.S.C. § 119 to Dutch Application No. 2018174, filed Jan. 16, 2017.

FIELD OF THE INVENTION

The subject matter of the present disclosure relates generally to a method for eviscerating a poultry carcass and relates generally to an evisceration apparatus for eviscerating such a poultry carcass suspended by the legs.

BACKGROUND OF THE INVENTION

WO2016/013931 relates to a device and method for eviscerating slaughtered poultry suspended by the legs, using e.g., an evisceration tool having two parts that are at their lower ends connected to each other with a rod, and which cooperates with a pre-lifting tool for lifting the gizzard prior to the actual evisceration tool passes along the breast side of the body cavity past the liver, before the evisceration tool is lifted out of the body cavity of the poultry.

EP-A-0 839 455 relates to a device for removing the viscera from the carcass of a slaughtered bird, including e.g., means for holding the carcass with its vent upward, means for gripping the gullet, the gripping including at least two jaw members which are movable towards each other to fixedly and positively clamp the gullet between them. The device can also apply a shield plate next to the jaw members to enhance the penetration of the evisceration tool into the body cavity of the bird without tissue entering too soon between the jaw members.

EP-A-0 497 014 relates to a method for eviscerating a poultry carcass and relates to an evisceration apparatus for eviscerating such a poultry carcass suspended by the legs, wherein the apparatus includes e.g., an evisceration tool which is movable up and down, and into and out of a body cavity of the poultry, and wherein the evisceration tool includes two bracket halves that connect to each other with a hinge at a lower extremity of the tool to enable a rotational movement of the two bracket halves around the hinge, wherein the two bracket halves are embodied with cooperating clamping faces adjacent to and above the hinge for clamping a part of the viscera of the poultry when the two bracket halves are moved towards each other by a rotational movement around the hinge from an open position wherein the clamping faces are distant from each other into a closed position wherein the clamping faces are moved towards each other.

In an exemplary method that is indicated in EP-A-0 497 014, the evisceration tool is introduced in its open position into the body cavity of the poultry until it reaches a lowermost position in the body cavity of the poultry; whereafter the two bracket halves are moved towards each other from the open position into a closed position therewith breaking tissue connections of the viscera with the remainder of the poultry carcass so that eventually a part of the viscera of the poultry, notably the gullet, is clamped. After that the two bracket halves are moved in their closed position out of the body cavity of the poultry carcass together with the clamped viscera. WO01/52658 indicates in a particular embodiment shown in its FIGS. 9-11 the application of two substantially U-shaped strips, which can pivot with respect to one another and are coupled via a double pivot at their front end. These U-shaped strips are used as scraping member to separate abdominal fat from abdominal skin of poultry and have as such nothing to do with the present inventive subject matter of removing an entrails package from a body cavity of a bird suspended by the legs. It is further remarked that the two substantially U-shaped strips form a scraping member that cooperates with a support in the form of a flat plate, and that the scraping member is for that purpose moved upwards along the support for the purpose of scraping the abdominal fat off the abdominal skin. The scraping member and the flat plate do therefore not carry out a simultaneous and synchronous movement into or out of the poultry body cavity as embodiments of the present invention prescribe.

Accordingly, in one exemplary aspect, it is an object of the invention to improve the known methods and apparatuses and realize advantages in comparison with such that will become apparent from the following disclosure.

SUMMARY OF THE INVENTION

In certain exemplary aspects, the present invention relates generally to a method for eviscerating a poultry carcass and relates generally to an evisceration apparatus for eviscerating such a poultry carcass suspended by the legs. The apparatus, in an exemplary embodiment, includes an evisceration tool that is movable up and down, and into and out of a body cavity of the poultry and can include two bracket halves that connect to each other with a hinge. Additional aspects and advantages of the invention will be set forth in part in the following description, or may be obvious from the description, or may be learned through practice of the invention.

The invention has several exemplary aspects that relate to different features of the exemplary method and apparatus of the invention, which can be applied separate from each other but also in combination to realize the benefits of the invention to their fullest. A first exemplary aspect of the invention relates to the feature that the evisceration tool can further include a support bracket positioned next to the two bracket halves, which support bracket is movable up and down, and into and out of the body cavity of the poultry simultaneously and synchronously with the two bracket halves, and that the support bracket is movable towards and away from the two bracket halves, wherein the support bracket can assume a position between the two bracket halves. Accordingly, during the process of evisceration, the support bracket is not only moved up and down and into and out of the body cavity of the poultry simultaneously and synchronously with the movement of the two bracket halves, but the support bracket is also moved to its position between the two bracket halves when the two bracket halves have reached their lowest position into the body cavity, prior to retraction of the two bracket halves from the body cavity.

This exemplary feature is particularly helpful in preventing that any part of the viscera package will slip so much downwards due to the pulling forces applied on the viscera package that parts of the viscera package may undesirably early move through a window between the two bracket halves. Such an early movement of viscera parts through the window between the two bracket halves will cause stretched intestines, which may contaminate the equipment and cause cross-contamination to later processed poultry.

This exemplary feature further prevents that any part of the viscera package will tip over during or after removal of the viscera package from the body cavity of the poultry in a direction that would result in that tissue of the viscera package will cover the hinge of the tool. When this tipping over in an undesired direction is not prevented the tissue may in the process of evisceration eventually cover the hinge at the lower extremity of the tool, and it will then not be possible for a viscera conveyor to take over the viscera package from its most favorable position. This applies e.g., in particular when the evisceration tool is mounted on a carousel machine; it will then not be possible to take over the viscera package in a single action. The additional handling that is then required is detrimental to the automation of this process.

According to exemplary aspects of the present invention, the apparatus may be arranged to cooperate with a transport shackle for an entrails package eviscerated from the body cavity of the poultry, wherein the support bracket is positioned between the transport shackle and the two bracket halves. This feature means that the viscera package can be taken over by the transport shackle in a single action when this transport shackle is in a position moving close to the periphery of the earlier mentioned carousel machine on which the evisceration tool is usually mounted. Suitably then the transport shackle can be equipped with jaws for clamping a part of the viscera or entrails package.

As mentioned the different exemplary features of the invention relate to different aspects which are applicable separate from each other or in combination. One of those aspects relates to the feature that the apparatus further includes a neck clamp for clamping a neck of the suspended poultry during movement of the two bracket halves out of the body cavity of the poultry while clamping a part of the viscera of the poultry. In the prior art the viscera package is simply pulled out of the body cavity while the poultry carcass is suspended by the legs and retained in position by the force of gravity. Gravity is however not always enough as a counterforce and the action of removing the two brackets with the clamped viscera package out of the body cavity may consequently result in tilting of the poultry carcass during evisceration. This may result in that the viscera package, and in particular the liver may get damaged through contact with the body cavity and the tilted hole through which the evisceration tool is moved out of the carcass body. With the neck clamp the orientation of the poultry carcass is secured, and removal of the viscera package can be realized without risk of damaging the entrails. This also prevents rejections of the processed packages and corresponding poultry carcasses.

Another independently applicable feature that can also be applied in combination with the other exemplary features of the invention mentioned herein relates to the aspect that the two bracket halves have curvatures that can be arranged such that a window is present immediately adjacent to and above the clamping faces when the two bracket halves are in the closed position, whereas the window immediately adjacent to the clamping faces can be substantially closed when the two bracket halves are in the open position wherein the clamping faces are distant from each other. This window enables that the larger parts of the viscera package, such as the gizzard and liver, can tip over through the window in a direction away from the supporting bracket so that after the tipping over is completed no tissue will cover the hinge of the two bracket halves. When the concerning organs are too large to pass through this window, the earlier mentioned support bracket prevents that tipping over of the package takes place in the wrong direction, which would result in covering of the hinge of the two bracket halves.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 8a-1 and 8b-1 show in isometric view and in cross-section the exemplary evisceration tool in its lowest position in the poultry body cavity wherein the tool is moved to its closed position immediately prior to moving the support bracket between the two bracket halves of the evisceration tool;

FIGS. 8a-2 and 8b-2 show in isometric view and in cross-section the evisceration tool in its lowest position in the poultry body cavity wherein the tool is moved to its closed position and the support bracket is moved between the two bracket halves of the evisceration tool;

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
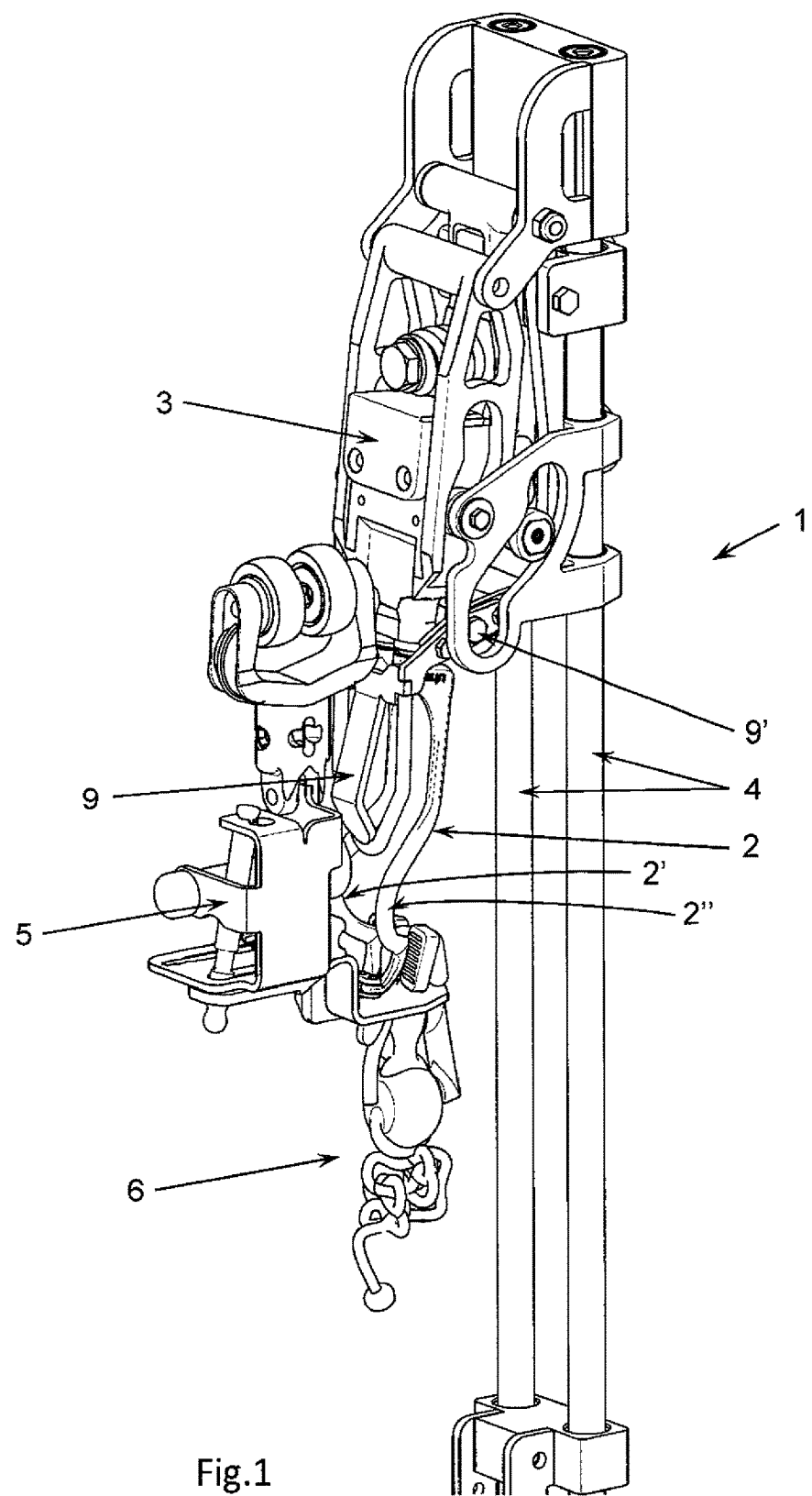
FIG. 1 schematically shows an exemplary evisceration apparatus according to the invention, wherein parts that do not contribute to the explanation of the invention are not shown.

FIG. 1 schematically shows an evisceration apparatus 1 according to an exemplary embodiment of the invention, together with a transport shackle 5 which is used for taking over and further conveying an entrails package or viscera 6 that is taken out of a poultry's body cavity. This will be further explained hereinafter. Such an evisceration apparatus 1 is preferably mounted on a carousel machine that is provided with multiple similar evisceration apparatuses. Since this is not essential to the invention this is not further shown in the drawing of the figures. In practice a processing line feeds a series of poultry carcasses to the carousel machine and the poultry carcasses are eviscerated at a high rate which is enabled by the multiple evisceration apparatuses of the carousel machine. In a manner known to the skilled person and therefore not shown in the drawing of the figures, each poultry carcass which is to be eviscerated is suspended by the legs while it is eviscerated.

The evisceration apparatus 1 includes an evisceration tool 2 that is movable up and down, and into and out of a body cavity of the poultry as will be explained hereinafter. For moving the evisceration tool 2 up and down it is mounted on a carrier 3 that is slidable along rods 4. Other solutions are however also feasible and the shown construction is exemplary and not essential to the invention.

Figure 2:
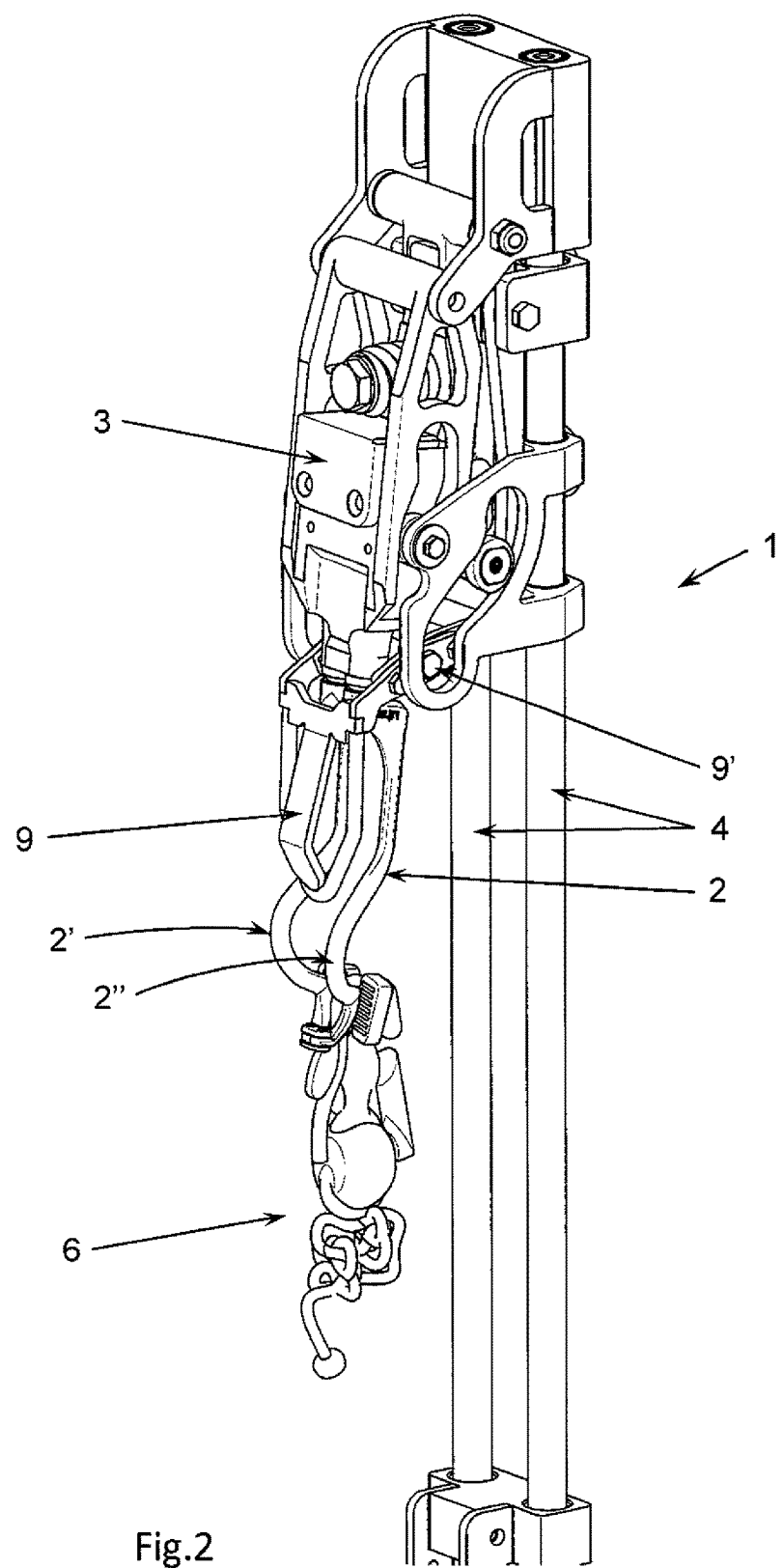
FIG. 2 shows the exemplary apparatus of FIG. 1, without the transport shackle for the entrails that are eviscerated.

The evisceration tool 2 includes two bracket halves 2', 2" that can be better seen in FIG. 2, wherein for clarity the transport shackle is not shown.

Figure 3A:
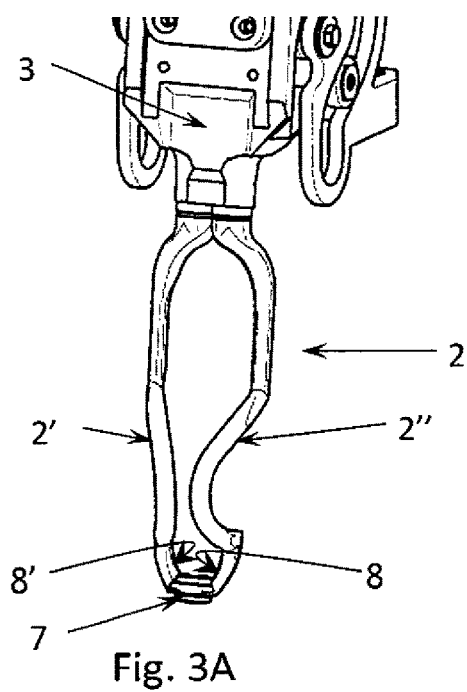
FIGS. 3A and 3B show the two bracket halves of the exemplary evisceration tool of the evisceration apparatus in an open and closed position respectively.
Figure 3B:
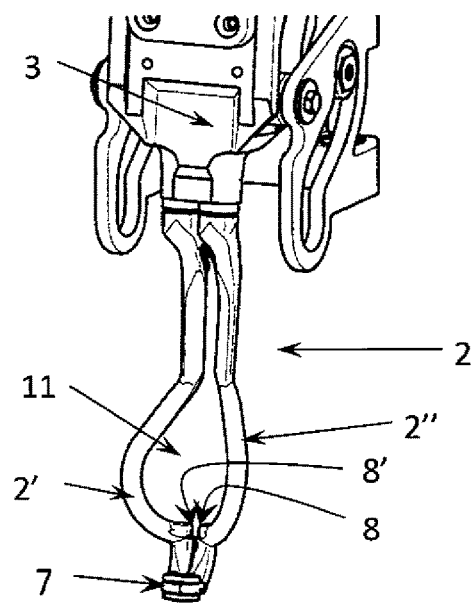

FIG. 3A and FIG. 3B show the two bracket halves 2', 2" that connect to each other with a hinge 7 at a lower extremity of the tool 2 to enable a rotational movement of the two bracket halves 2', 2" around the hinge 7. The two bracket halves 2', 2" are embodied with cooperating clamping faces 8, 8' adjacent to and above the hinge 7 for clamping a part of the viscera 6 of the poultry when the two bracket halves 2', 2" are moved towards each other from an open position as shown in FIG. 3A into a closed position as shown in FIG. 3B. FIG. 3A depicts that in the open position the clamping faces 8, 8' are distant from each other, whereas FIG. 3B depicts that in the closed position the clamping faces 8, 8' are moved from the open position towards each other. FIGS. 1 and 2 show the two bracket halves 2', 2" in the closed position of FIG. 3B, wherein the evisceration tool 2 clamps and holds the viscera package 6.

FIG. 3A and FIG. 3B further show that the two bracket halves 2', 2" are provided with curvatures that arrange that the two bracket halves delimit a window 11 immediately adjacent to the clamping faces 8, 8' of the two bracket halves 2', 2" when the bracket halves are in the closed position and the clamping faces 8, 8' are moved towards each other as shown in FIG. 3B, whereas the window immediately adjacent to the clamping faces 8, 8' is substantially closed or absent when the two brackets 2', 2" are in the open position and the clamping faces 8, 8' are distant from each other as shown in FIG. 3A.

Particularly FIG. 1 and FIG. 2 further show an exemplary aspect of the invention relating to the feature that the evisceration tool 2 further includes a support bracket 9 positioned next to the two bracket halves 2', 2". This support bracket 9 is movable up and down, and into and out of a poultry body cavity simultaneously and synchronously with the two bracket halves 2', 2". For that purpose it is preferable—although not essential—that the support bracket 9 is also mounted on the carrier 3 that is slidable along the rods 4. Other constructions are however also feasible as long as it is secured that the support bracket 9 will move simultaneous and synchronous with the two bracket halves 2', 2" into and out of the poultry body cavity during evisceration.

The support bracket 9, for this exemplary embodiment, may be rotatable by mounting it with a hinge 9' on the carrier 3 to enable movement of the support bracket 9 towards and away from the two bracket halves 2', 2" of the evisceration tool 2, such that the support bracket 9 can assume a position between the two bracket halves 2', 2". This will be further explained hereinafter.

Figure 4A:
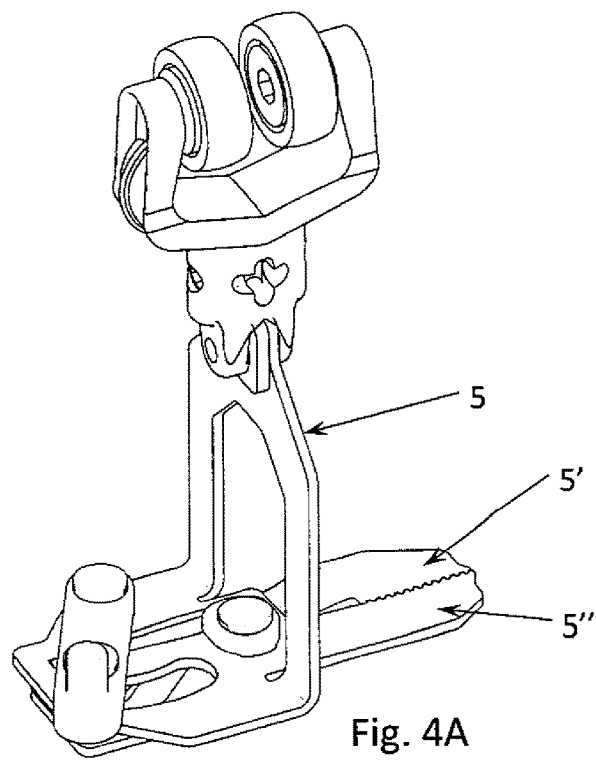
FIGS. 4A and 4B show an exemplary transport shackle for a viscera package eviscerated from a poultry carcass.
Figure 4B:
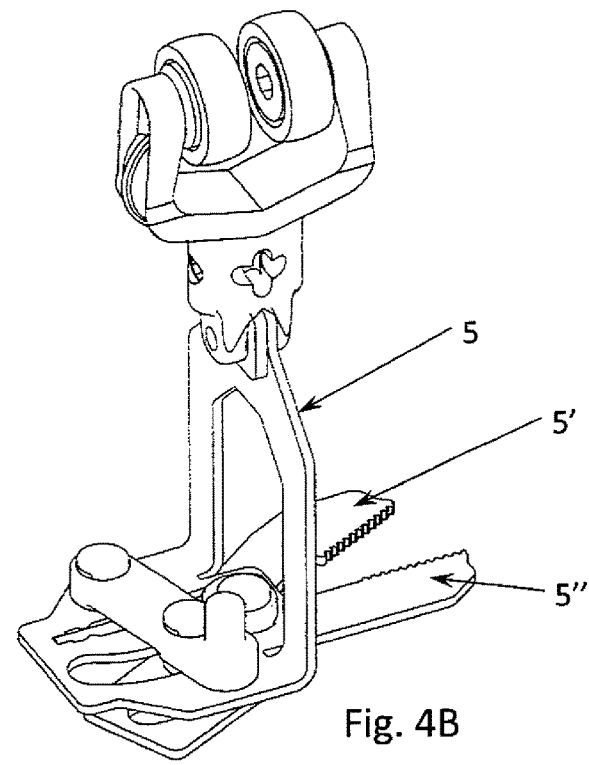

The support bracket 9 is thus arranged that it can assume and maintain a position to prevent that any part of the viscera package will slip so much downwards due to the pulling forces applied on the viscera package that parts of the viscera package may undesirably early move through the window 11 between the two bracket halves 2', 2". Such an early movement of viscera parts through the window 11 between the two bracket halves 2', 2" will cause stretched intestines which may contaminate the equipment and cause cross-contamination to later processed poultry. The support bracket 9 further prevents that any part of the viscera package 6 will tip over in a undesired direction during or after removal of the viscera package 6 from the body cavity of the poultry so as to prevent that tissue of the viscera package 6 will eventually cover the hinge 7 at the lower extremity of the tool 2. The importance thereof resides in the ability of the evisceration tool 2 to cooperate with the transport shackle 5 which can move into the periphery of the carousel machine on which the evisceration tool 2 is mounted, so that the transport shackle 5 can take over the entrails package 6 eviscerated from the body cavity of the poultry in a single action and convey it for further processing down the line. This movement of the transport shackle 5 into the periphery of the carousel machine means that the support bracket 9 is then positioned between the transport shackle 5 and the two bracket halves 2', 2". To enable that the transport shackle 5 can take over the viscera package 6 from the evisceration tool 2 in a single action, the transport shackle 5 is suitably equipped with jaws 5', 5" for clamping a part of the viscera or entrails package as is clearly shown in FIGS. 4A and 4B.

Figure 5:
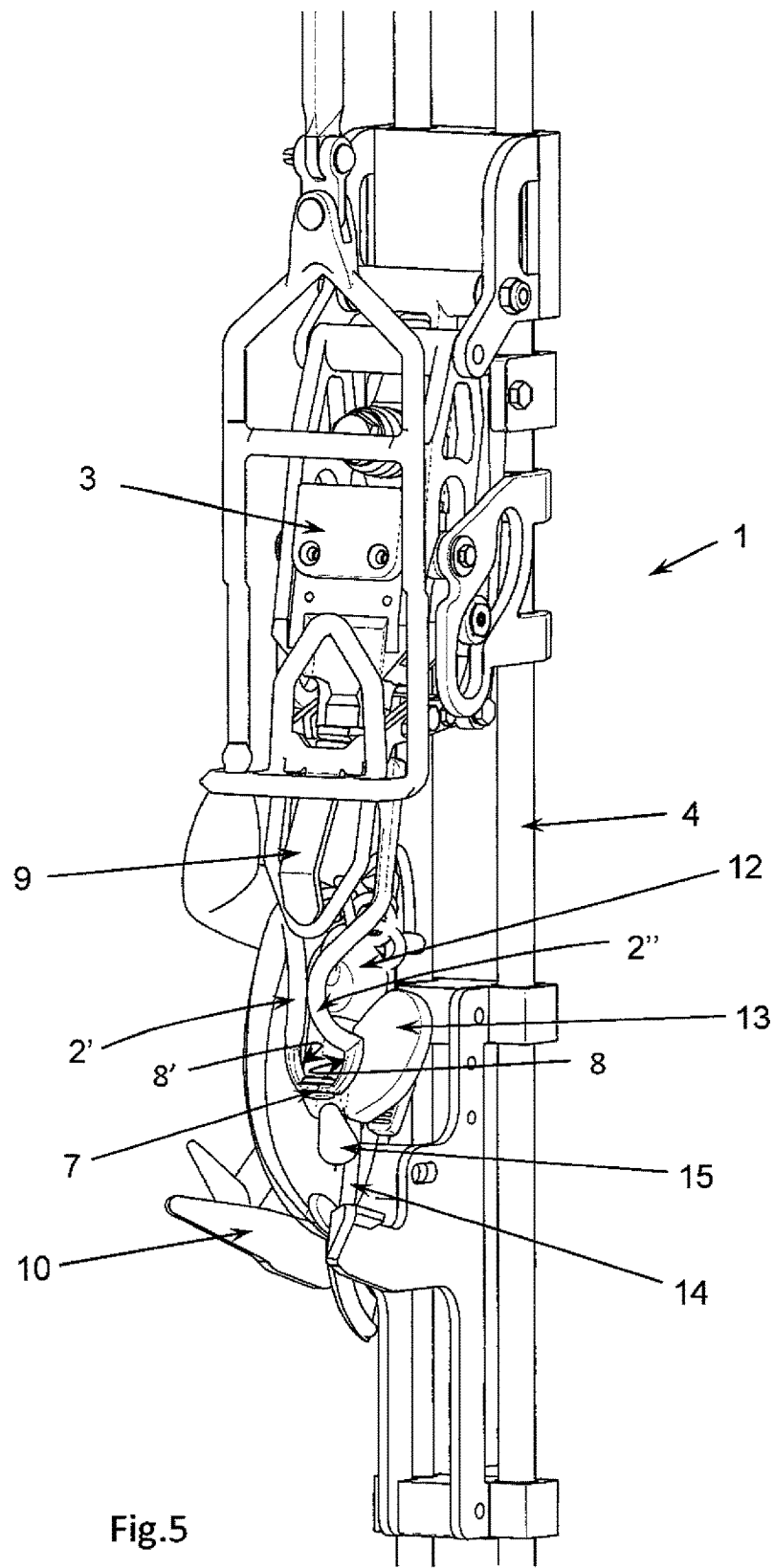
FIGS. 5 and 6 show the initial step of moving the exemplary evisceration tool into the poultry body cavity.
Figure 6:
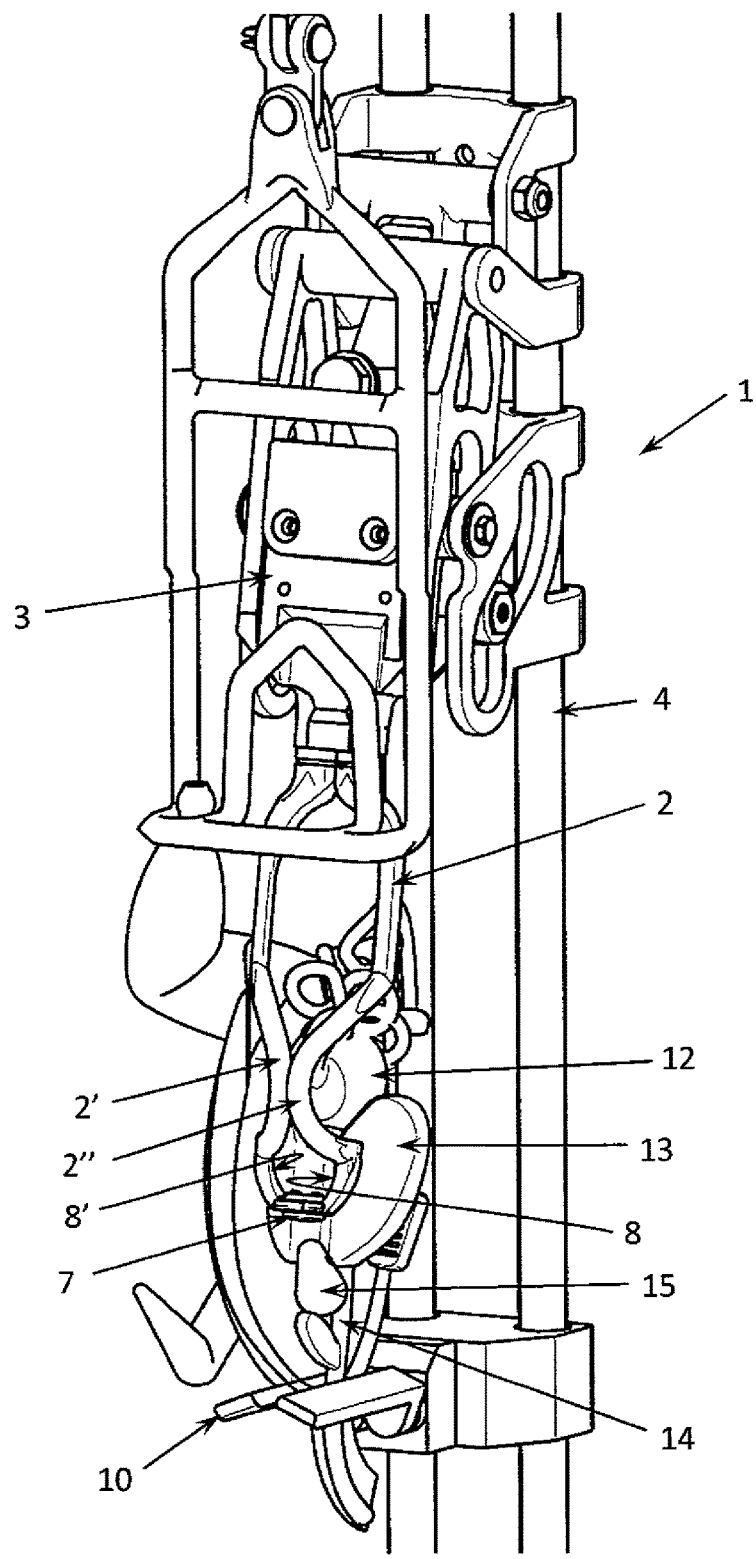

Turning now to FIG. 5 it is shown that the exemplary evisceration apparatus 1 can further as an option include a neck clamp 10 for clamping a neck of the suspended poultry. In FIG. 5 the neck clamp 10 is open but it is closed during movement of the two bracket halves 2', 2" out of the body cavity of the poultry while clamping a part of the viscera 6 of the poultry as will be elucidated hereinafter with reference to FIGS. 8 and 9. Otherwise FIG. 5 (and also FIG. 6 that depicts the apparatus of the invention without support bracket) shows the initial movement of the evisceration tool 2 into a poultry body cavity, wherein the two bracket halves 2', 2" are in their open position, and wherein the tool 2 passes the gizzard 12 and liver 13 at the breast side of the bird.

Figure 7A:
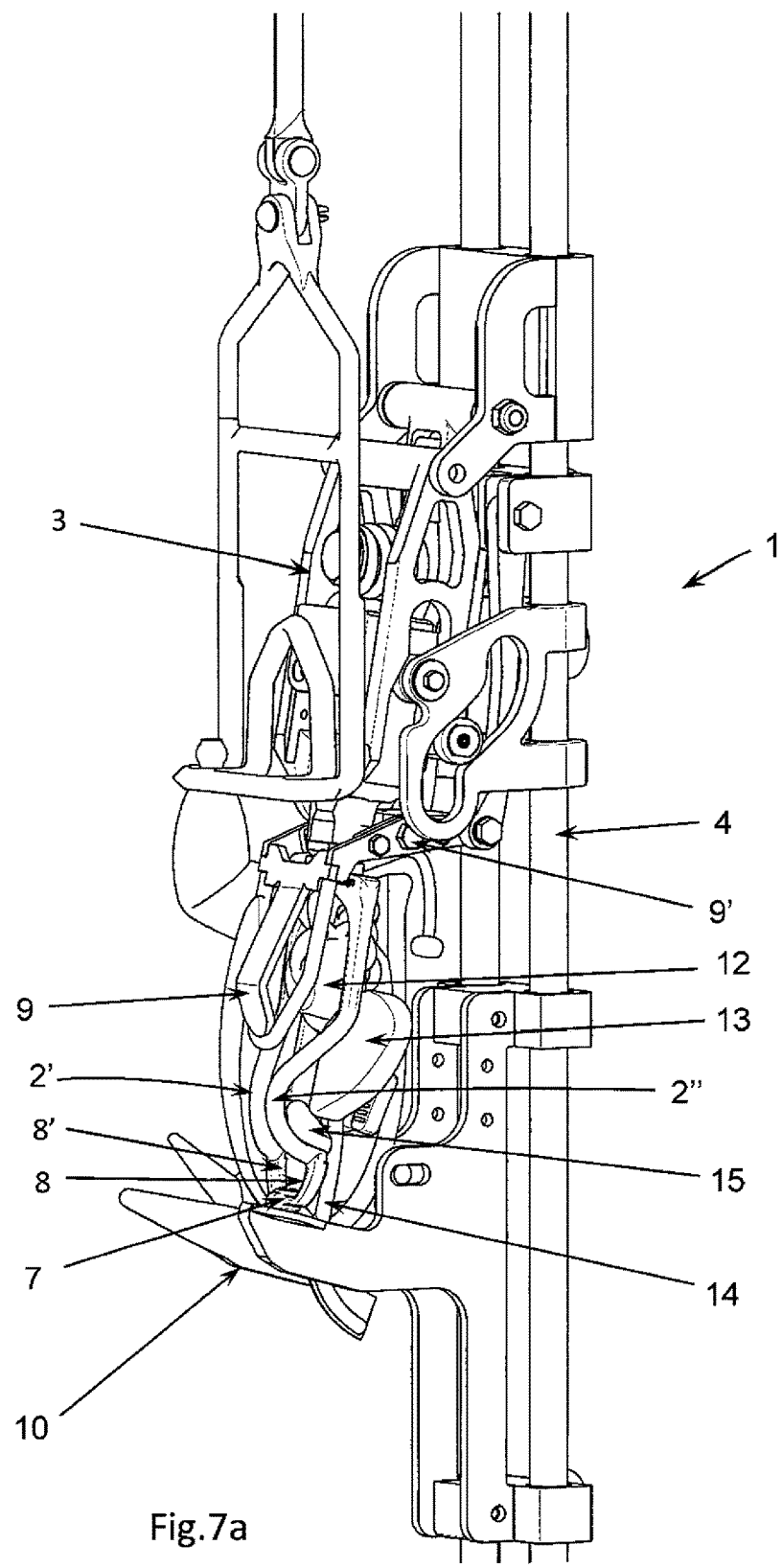
FIGS. 7a and 7b show in isometric view and in cross-section the exemplary evisceration tool in its lowest position in the poultry body cavity wherein the tool is in its open position and the support bracket is not yet moved between the two bracket halves of the evisceration tool.
Figure 7B:
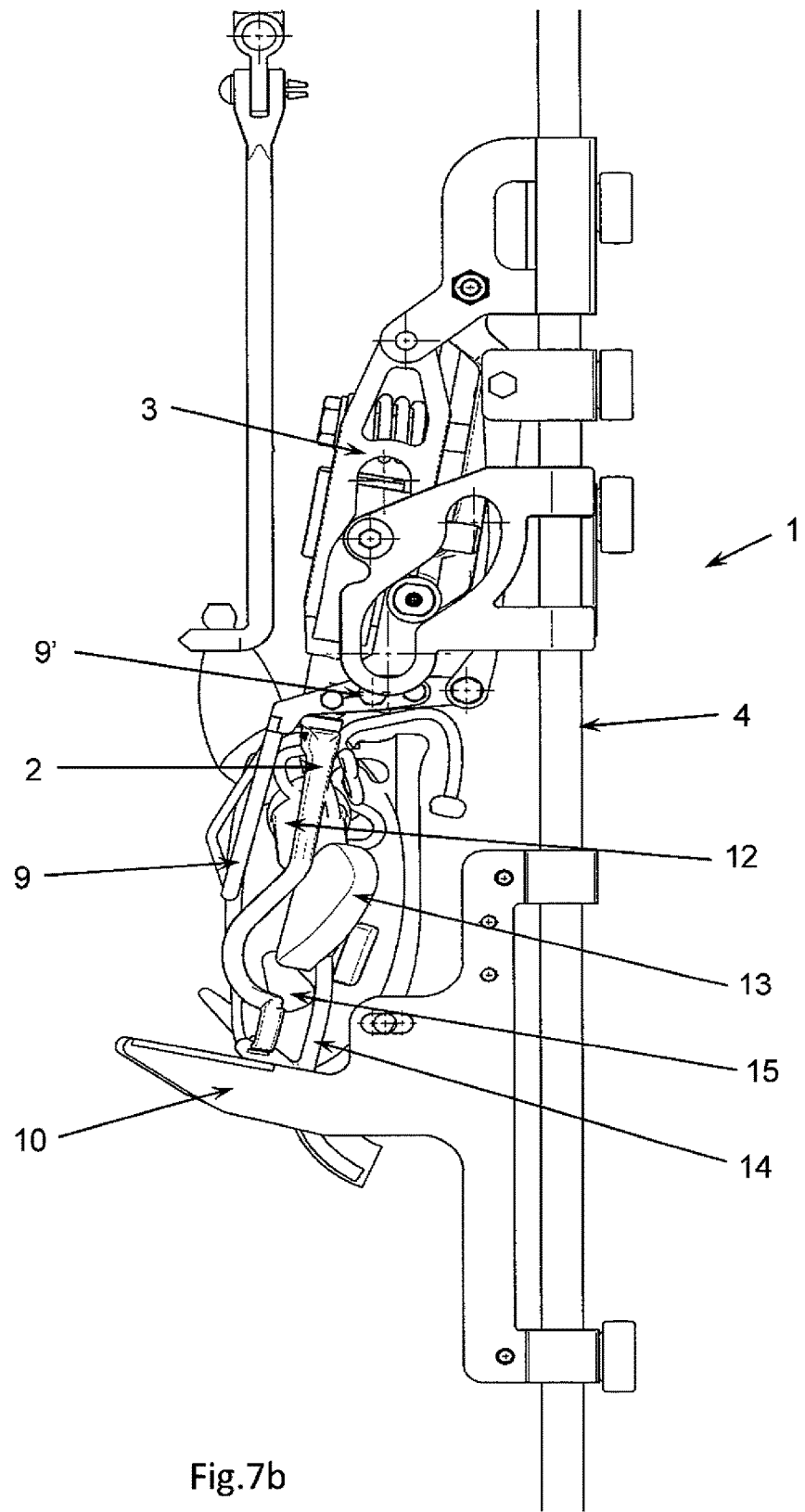

FIGS. 7a and 7b show that the exemplary evisceration tool 2 has reached its lowest position in the poultry body cavity, wherein the two bracket halves 2', 2" are still in their open position. Likewise also the support bracket 9 is in an initial 'open' position next to the two bracket halves 2', 2" and distant from being positioned between the two bracket halves, which can be called a 'closed' position. For clarity also the relative position of the gizzard 12, the liver 13, and the gullet 14 which is to be clamped or pinched by the two bracket halves 2', 2" is shown.

Figures 1, 8A:
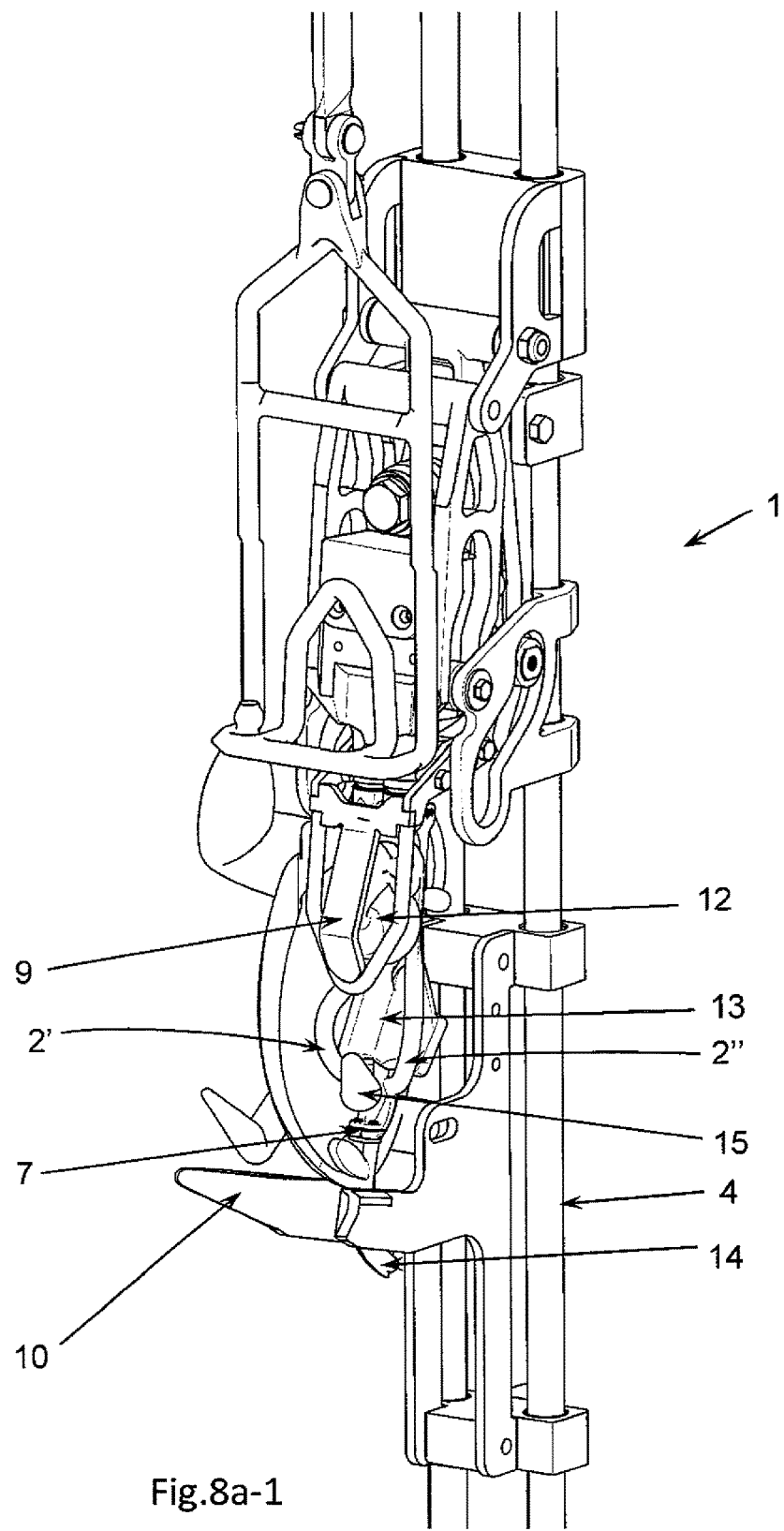
Figures 1, 8B:
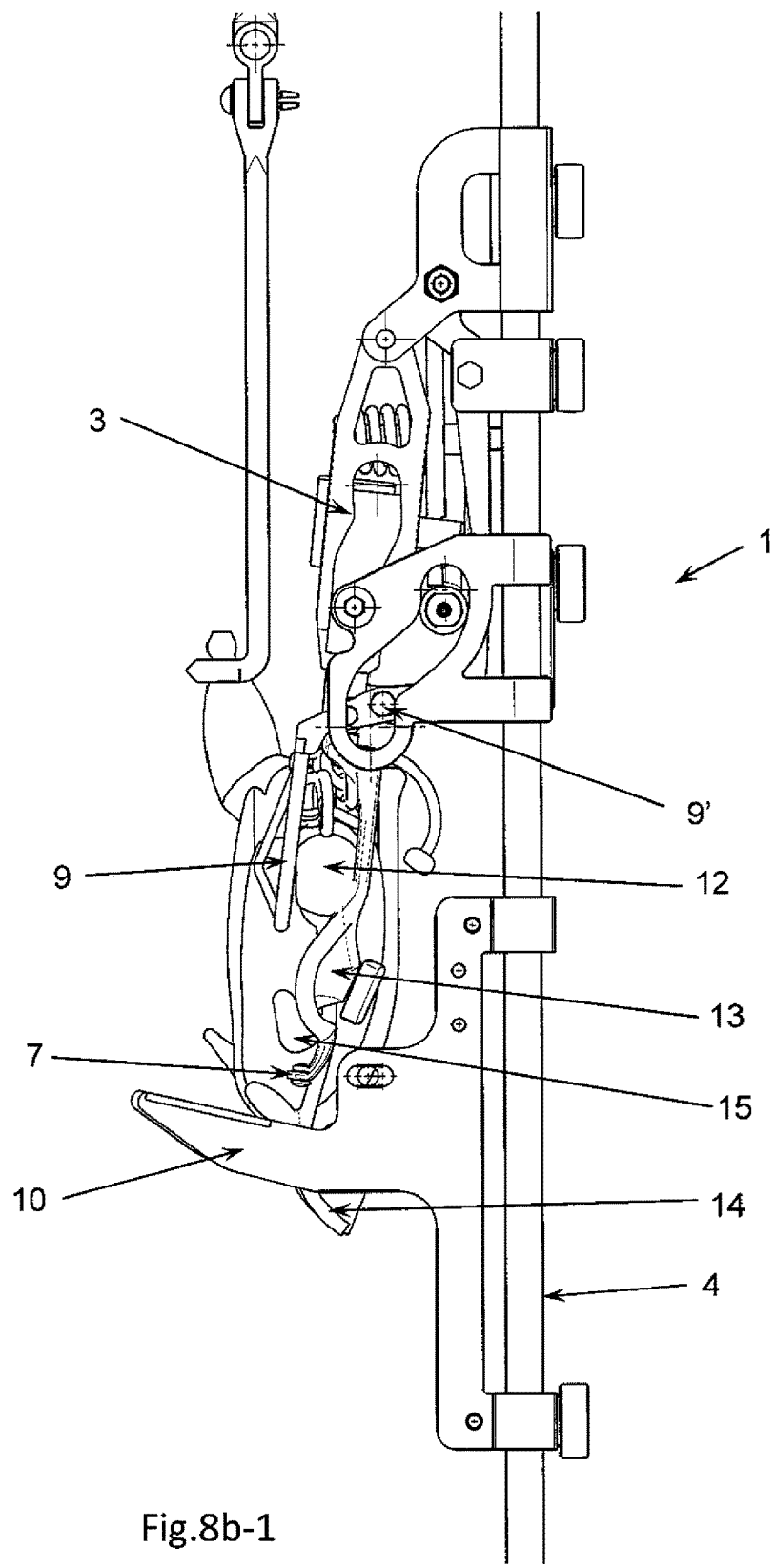
Figures 2, 8A:
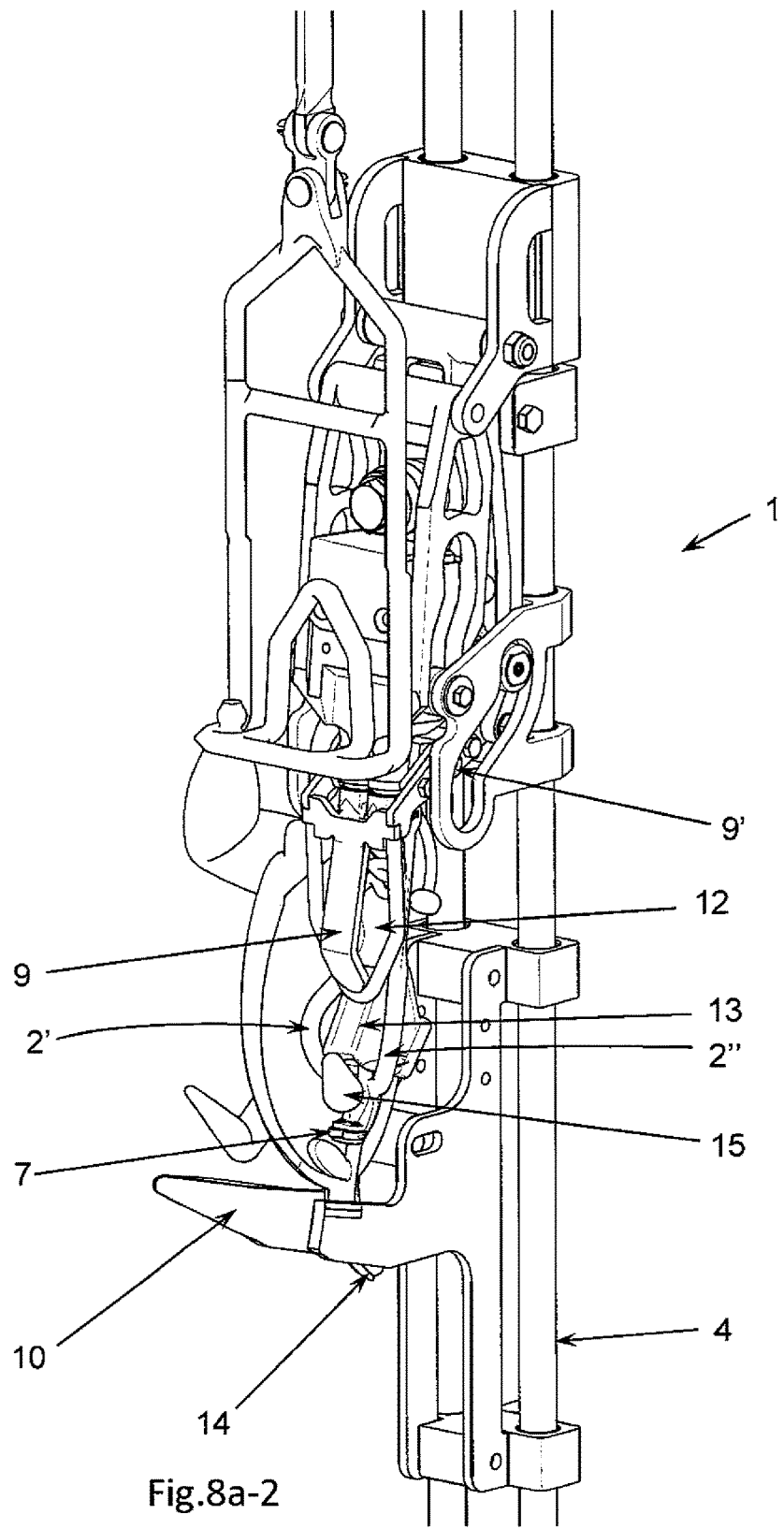
Figures 2, 8B:
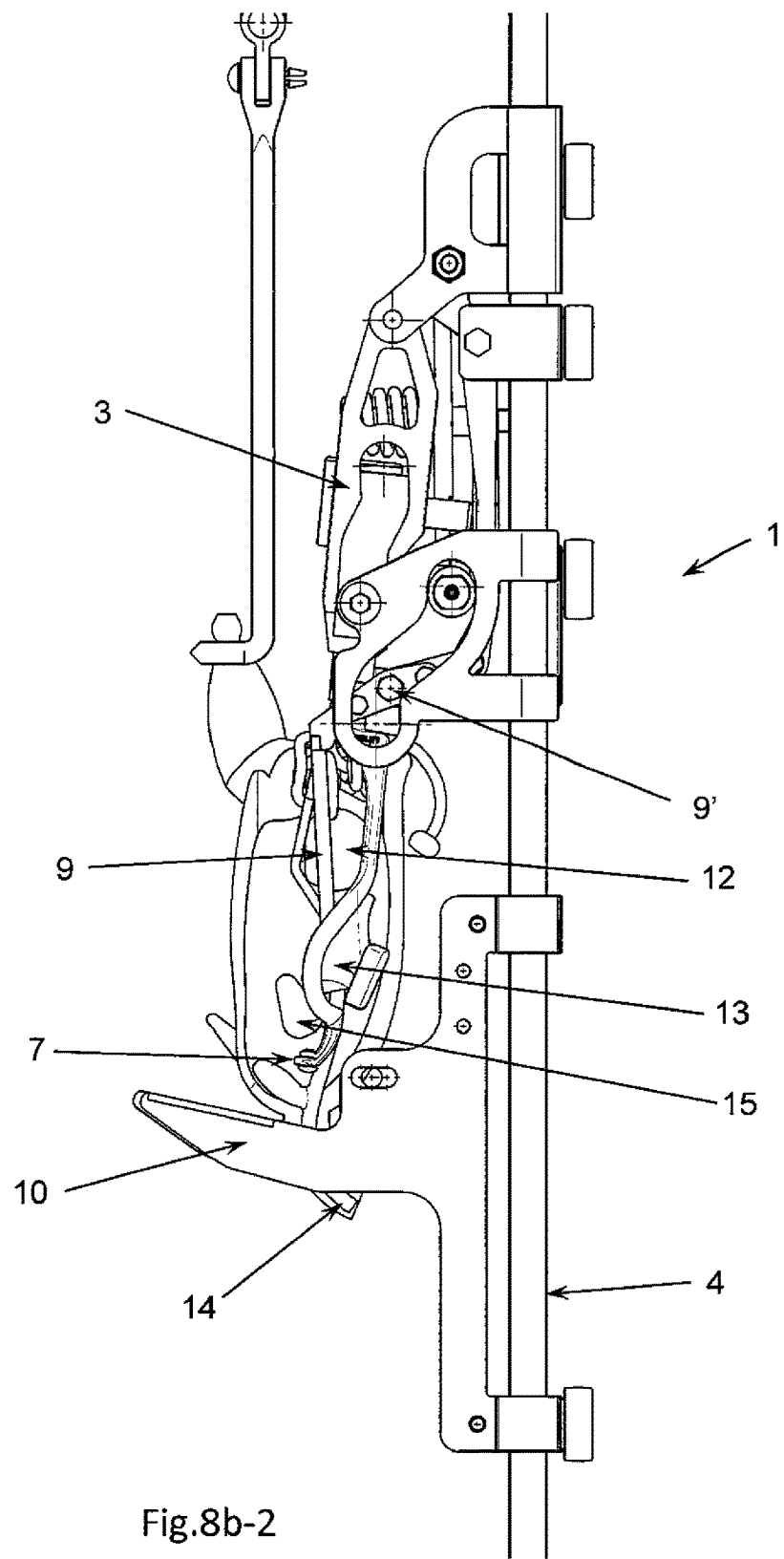

In FIG. 8*a*-1 and FIG. 8*b*-1 it is shown that subsequently the neck clamp 10 is closed, and the gullet 14 is clamped by moving the two bracket halves 2', 2" into their closed position. The gizzard 12 is shown as still being positioned between the evisceration tool 2 and the support bracket 9, wherein the support bracket 9 prevents that the viscera package 6 will tip over in an undesired direction which would result in that tissue of the viscera package 6 will cover the hinge 7 at the lower extremity of the tool 2.

To avoid slipping of the gizzard 12 or undesired movement of the gizzard or other parts of the viscera package through the window 11 between the two bracket halves 2', 2" and away from the position defined by the support bracket 9 and the two bracket halves 2', 2", the support bracket 9 is moved or turned to its position between the two bracket halves 2', 2" shown in FIG. 8*a*-2 and FIG. 8*b*-2. This movement is enabled in this exemplary embodiment by the hinge 9' with which the support bracket 9 is mounted to the carrier 3. The movement of the support bracket 9 may however also suitably be occasioned by any other known means. Usually the movement of the support bracket 9, is controlled, similar to the movement of the bracket halves 2', 2", by a cam wheel connecting to the support bracket 9 and following a cam track of a rotating or carousel machine on which the evisceration apparatus is mounted. This is entirely known technology for the skilled person and requires no further elucidation. The construction is preferably designed so as to move the support bracket 9 between the two bracket halves 2', 2" of the evisceration tool 2 when the two bracket halves 2', 2" have reached their lowest position in the body cavity of the poultry, and prior to retraction of the evisceration tool 2 from the body cavity of the poultry. The support bracket 9 ensures maintaining the position of the gullet during evisceration and prevents that tissue can undesirably cover the hinge 7 which would stand in the way of the object to enable the transport shackle 5 to take over the viscera package 6 of the evisceration tool 2 in a single action.

Figure 9A:
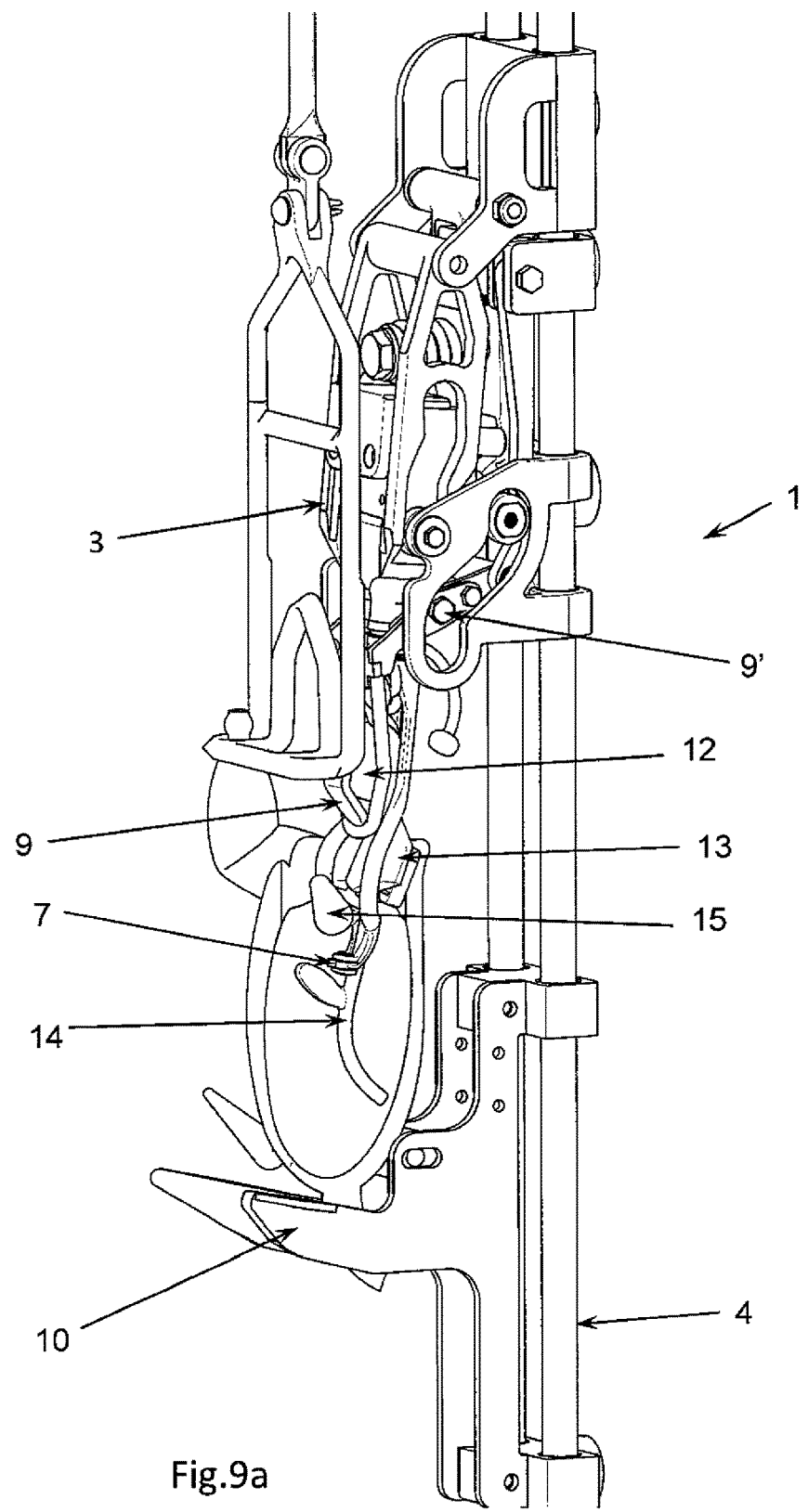
FIGS. 9a and 9b show in isometric view and in cross-section the evisceration tool moving upwards while the poultry's neck is clamped by a neck clamp.
Figure 9B:
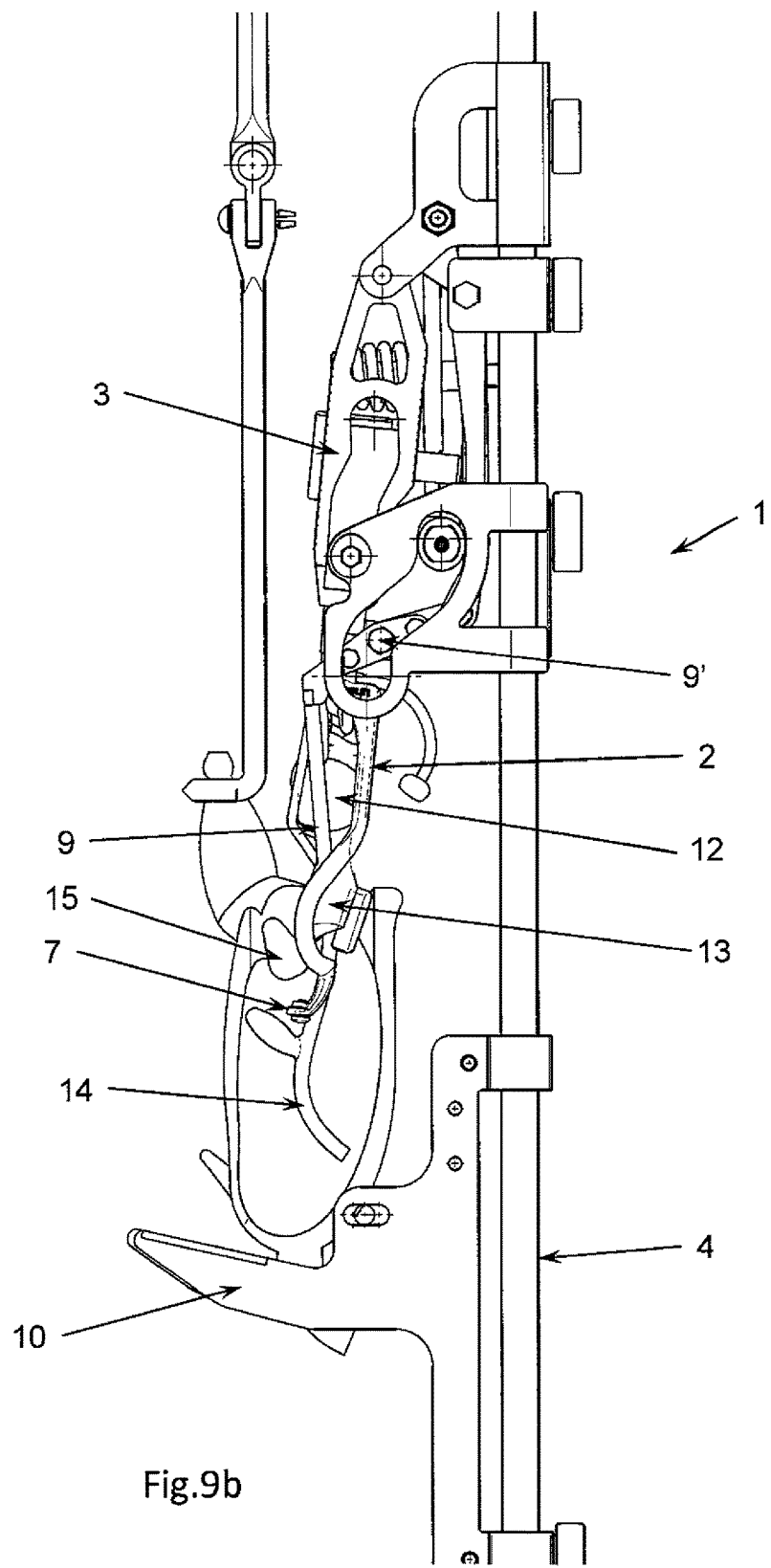

FIG. 9*a* and FIG. 9*b* show that the evisceration tool 2 and the support bracket 9 are retracted and moved out of the bird. This movement of the evisceration tool 2 and the support bracket 9 occurs simultaneously and synchronously and starts at their lowest position in the poultry body cavity shown in FIGS. 8*a*-2 and 8*b*-2. During this movement the gullet 14 is clamped between the two bracket halves 2', 2" of the evisceration tool 2, and preferably the neck of the poultry is clamped by the neck clamp 10. This simultaneous clamping of the gullet 14 and the neck of the poultry carcass promotes the effective separation of the viscera package 6 from the remainder of the poultry carcass. Because of the simultaneous and synchronous movement of the evisceration tool 2 and the support bracket 9, the support bracket 9 continuously and effectively avoids that any part of the viscera package 6 will tip over in an undesired direction which would result in that tissue would eventually cover the hinge 7 of the evisceration tool 2.

Figure 10A:
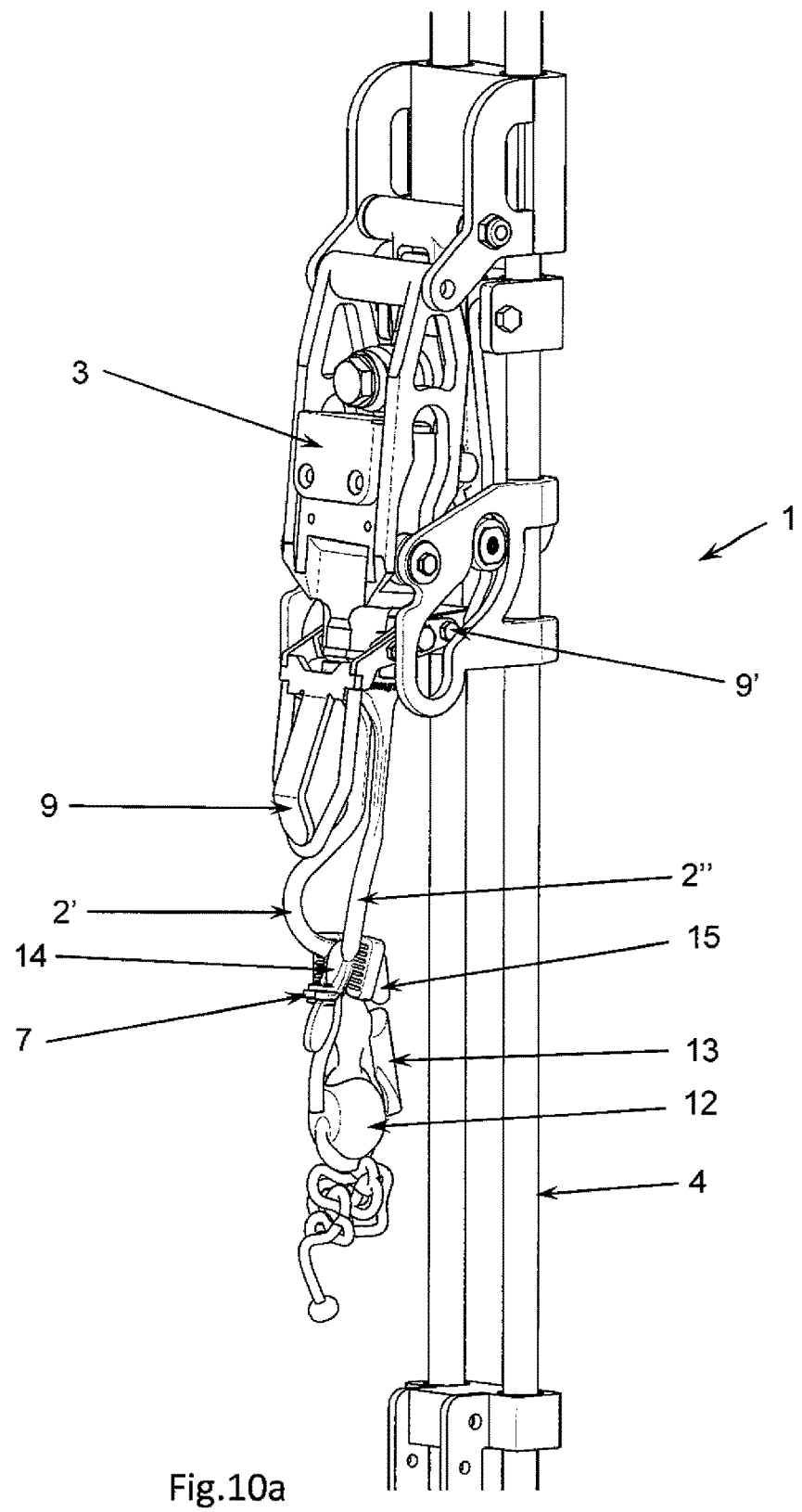
FIGS. 10a and 10b show in isometric view and in cross-sectional view a first example of a viscera package of average dimensions taken out with the evisceration tool of the invention.
Figure 10B:
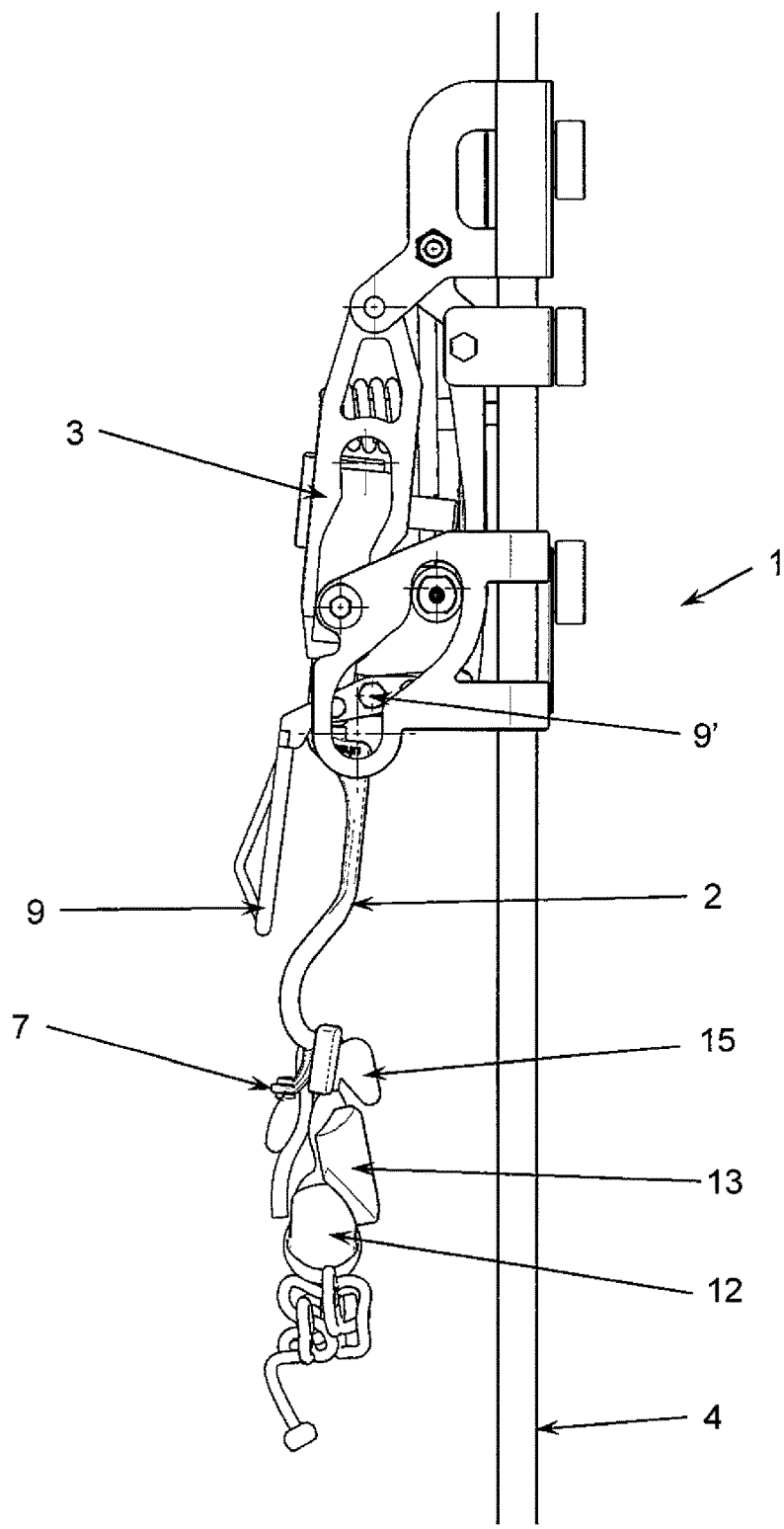

In FIGS. 10*a* and 10*b* is shown that due to the exemplary feature that the two bracket halves 2', 2" are provided with curvatures that arrange that the two bracket halves de-limit a window 11 when the bracket halves are in the closed position (as explained with reference to FIG. 3B), it is possible for the gizzard 12 and the other organs, such as the heart 15 and the liver 13, to move through the window 11 such that the viscera package 6 will be suspended from the evisceration tool 2 without any part of the viscera package 6 covering the hinge 7 of the evisceration tool 2. Accordingly it is possible for the transport shackle 5 which moves into the periphery of a carousel machine on which the evisceration tool 2 is mounted, to grip and take over the gullet 14 from the evisceration tool 2 in a single action.

Figure 11A:
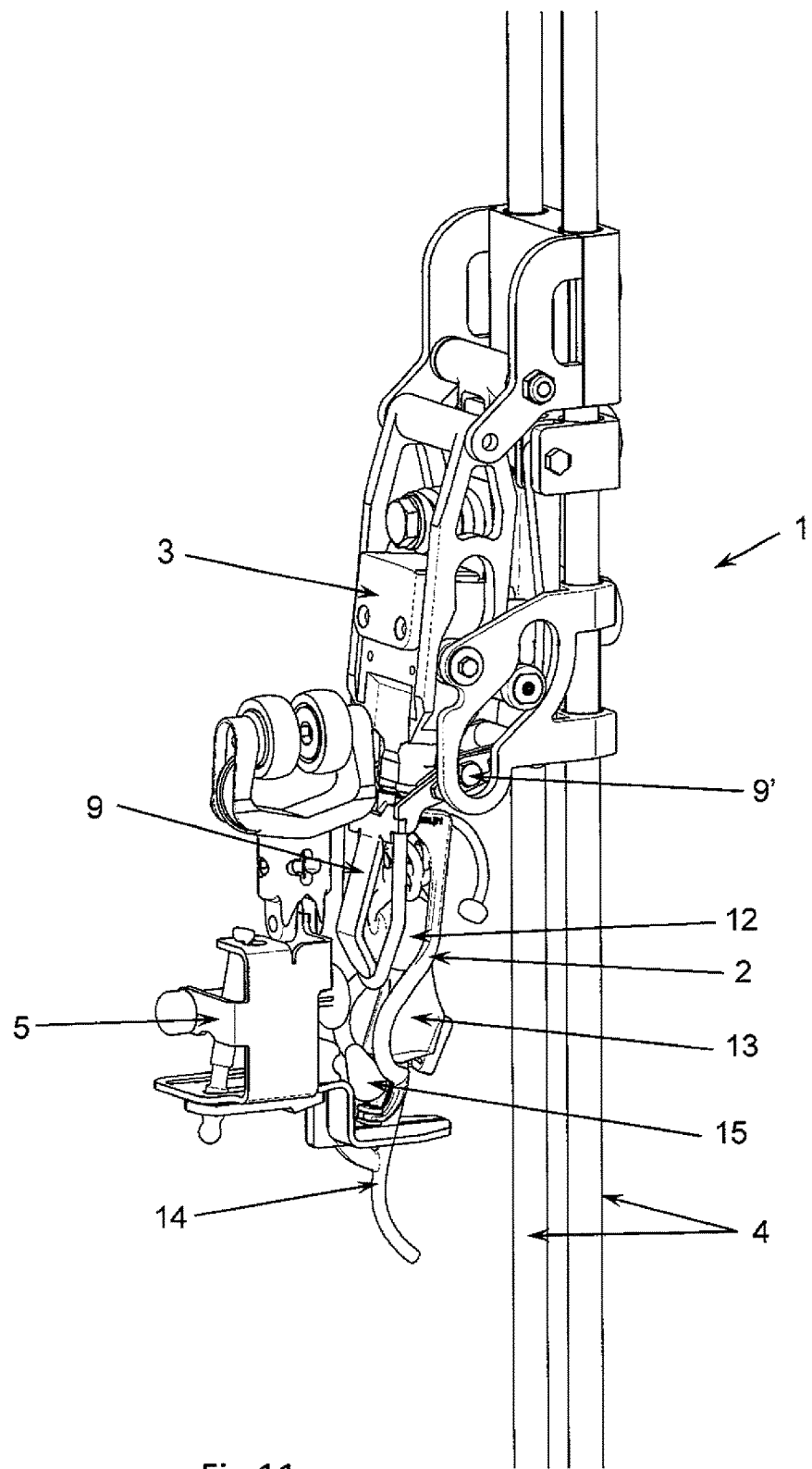
FIGS. 11a and 11b show in isometric view and in cross-sectional view a second example of a viscera package of more than average dimensions taken out with the evisceration tool of the invention; whilst being taken over by a transport shackle.
Figure 11B:
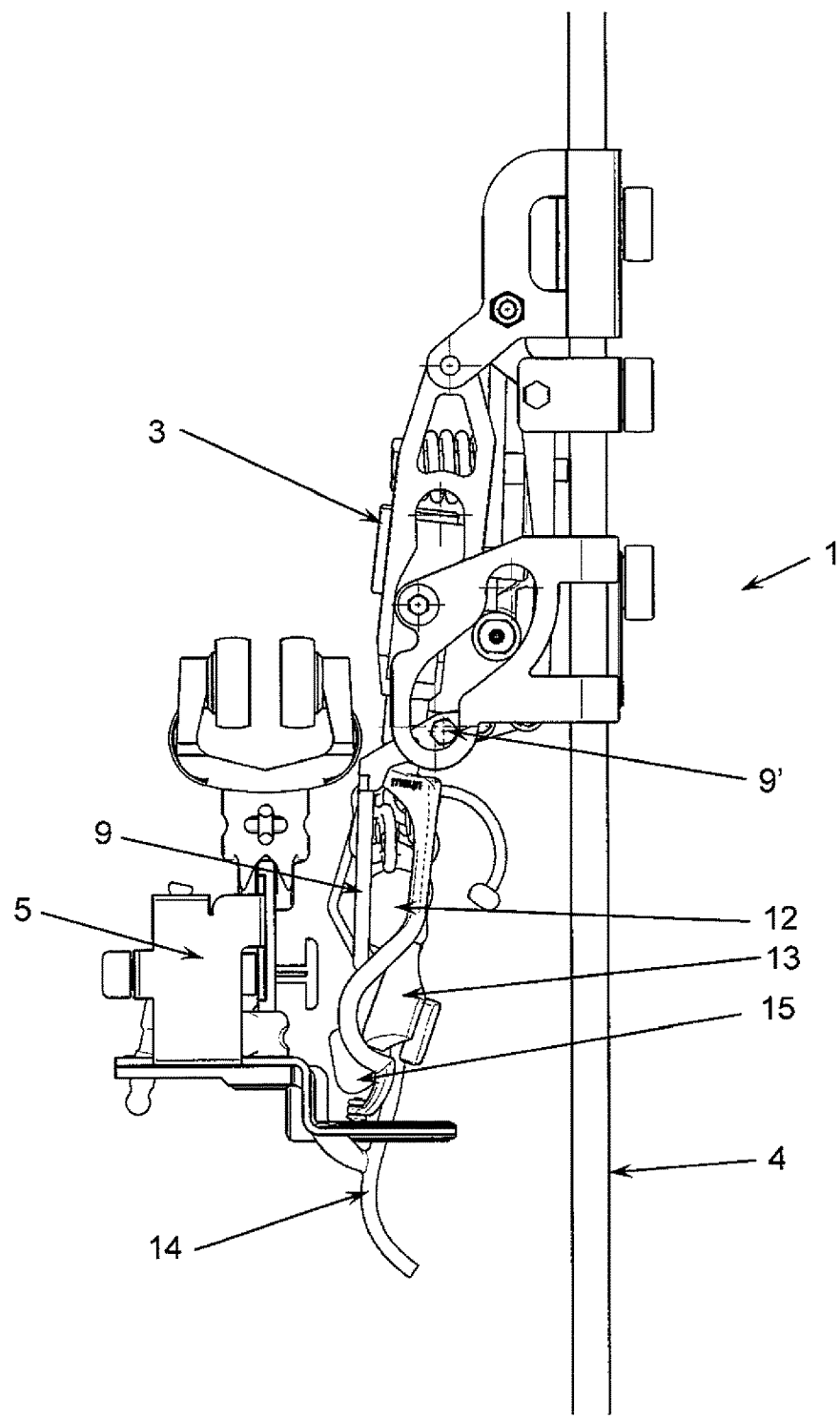

FIGS. 11*a* and 11*b* show an alternative situation in which the gizzard 12 has dimensions that prevent it to move through the central window 11 of the evisceration tool 2 when its two bracket halves 2', 2" are in the closed position. In that situation the original orientation of the viscera package 6 in the poultry body cavity is maintained also after its removal from the poultry body cavity. FIGS. 11*a* and 11*b* then show that likewise it is possible for the transport shackle 5 which moves into the periphery of a carousel machine on which the evisceration tool 2 is mounted, to grip and take over the gullet 14 from the evisceration tool 2 without there being any tissue covering the hinge 7 of the two bracket halves 2', 2" which could form a hindrance for the transport shackle 5 to take over the viscera package 6.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An evisceration apparatus for eviscerating a poultry carcass suspended by the legs, the apparatus comprising:
    an evisceration tool that is movable up and down, and into and out of a body cavity of the poultry, the evisceration tool comprising two bracket halves that connect to each other with a hinge at a lower extremity of the evisceration tool to enable a rotational movement of the two bracket halves around the hinge;
    the two bracket halves embodied with cooperating clamping faces adjacent to and above the hinge for clamping a part of the viscera of the poultry when the two bracket halves are moved by a rotational movement around the hinge towards each other from an open position into a closed position;
    where the evisceration tool further comprises a support bracket positioned next to the two bracket halves, which support bracket is movable up and down, and into and out of the body cavity of the poultry simultaneously and synchronously with the two bracket halves, the support bracket movable towards and away from the two bracket halves, wherein the support bracket can assume a position between the two bracket halves.

2. The evisceration apparatus according to claim 1, wherein the support bracket is arranged to prevent that any part of the viscera will tip over during or after removal of the viscera from the body cavity of the poultry in a direction that would result in tissue of the viscera covering the hinge of the tool.

3. The evisceration apparatus according to claim 1, wherein the apparatus is arranged to cooperate with a transport shackle for an entrails package eviscerated from the body cavity of the poultry, wherein the support bracket is positioned between the transport shackle and the two bracket halves.

4. The evisceration apparatus according to claim 3, wherein the transport shackle is equipped with jaws for clamping a part of the viscera or an entrails package.

5. The evisceration apparatus according to claim 1, wherein the apparatus further comprises a neck clamp for clamping a neck of the suspended poultry during movement of the two bracket halves out of the body cavity of the poultry while clamping a part of the viscera of the poultry.

6. The evisceration apparatus of claim 1, wherein the evisceration apparatus is mounted on a carousel machine.

7. An evisceration apparatus for eviscerating a poultry carcass suspended by the legs, the apparatus comprising:
    an evisceration tool that is movable up and down, and into and out of a body cavity of the poultry, wherein the evisceration tool comprises two bracket halves that connect to each other with a hinge at a lower extremity of the tool;
    wherein the two bracket halves are embodied with cooperating clamping faces adjacent to and above the hinge for clamping a part of the viscera of the poultry when the two bracket halves are moved towards each other from an open position wherein the clamping faces are distant from each other into a closed position wherein the clamping faces are moved from the open position towards each other; and
    wherein the two bracket halves are provided with curvatures that arrange that the two bracket halves delimit a window in one of the open and closed positions of the two bracket halves, wherein the curvatures are arranged such that the window is present immediately adjacent to the clamping faces when the two bracket halves are in the closed position, whereas the window immediately adjacent to the clamping faces is substantially closed or absent when the two brackets are in the open position wherein the clamping faces are distant from each other.

8. The evisceration apparatus of claim 7, wherein the evisceration apparatus is mounted on a carousel machine.

9. A method for eviscerating poultry suspended by the legs, comprising:
    using an evisceration tool comprising two bracket halves that connect to each other with a hinge at a lower extremity of the tool to enable a rotational movement of the two bracket halves around the hinge, wherein the two bracket halves are embodied with cooperating clamping faces adjacent to and above the hinge for clamping a part of the viscera of the poultry when the two bracket halves are moved towards each other from an open position wherein the clamping faces are distant from each other into a closed position wherein the clamping faces are moved from the open position towards each other;
    introducing the evisceration tool in its open position wherein the clamping faces are distant from each other into the body cavity of the poultry and moving it up to a lowermost position in the body cavity of the poultry;
    moving the two bracket halves towards each other by a rotational movement around the hinge from the open position into a closed position therewith breaking tissue connections of the viscera with the remainder of the poultry carcass and eventually clamping a part of the viscera of the poultry;
    removing the two bracket halves in their closed position from the body cavity of the poultry carcass together with the clamped viscera; and
    providing the evisceration tool with a support bracket that is movable from a position next to the two bracket halves to a position between the two bracket halves, and moving the support bracket up and down and into and out of the body cavity of the poultry simultaneously and synchronously with the movement of the two bracket halves, wherein prior to retraction of the two bracket halves from the body cavity, the support bracket is moved to its position between the two bracket halves when the two bracket halves have reached their lowest position in the body cavity.

10. The method for eviscerating poultry suspended by the legs according to claim 9, further comprising preventing by means of the support bracket that any part of the viscera package will tip over during or after removal of the viscera package from the body cavity of the poultry in a direction that would result in that tissue of the viscera package will cover the hinge at the lower extremity of the tool.

11. The method for eviscerating poultry suspended by the legs according to claim 9, further comprising providing a transport shackle for an entrails package eviscerated from the body cavity of the poultry and positioning the transport shackle such that the support bracket is positioned between the transport shackle and the two bracket halves.

12. The method for eviscerating poultry suspended by the legs according to claim 9, further comprising fixing the neck of the poultry carcass in position during movement of the two bracket halves out of the body cavity of the poultry together with the clamped viscera.

13. The method for eviscerating poultry suspended by the legs according to claim 9, further comprising mounting the evisceration tool on a carousel machine.

* * * * *